May 19, 1964  J. S. SCIUTO, JR  3,133,755
PIN RETAINER CONSTRUCTION FOR COUPLINGS
Filed June 29, 1960
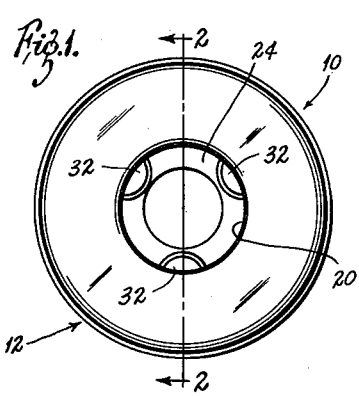
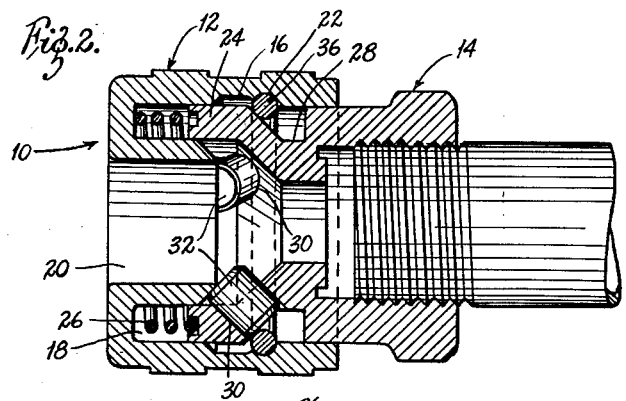
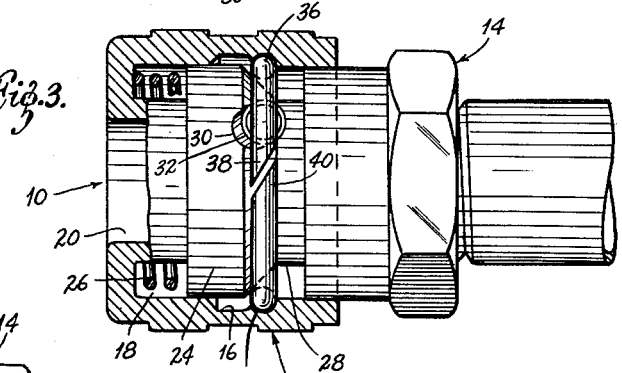
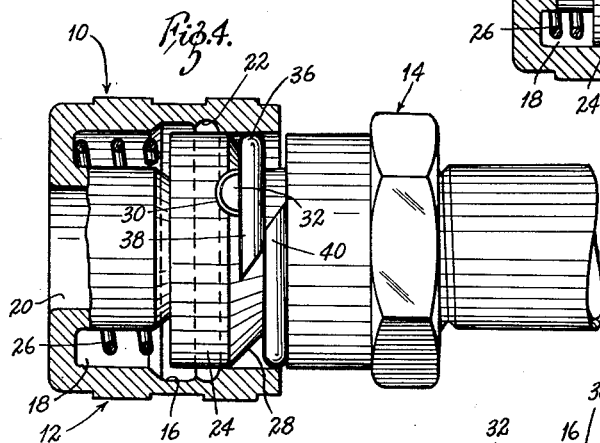
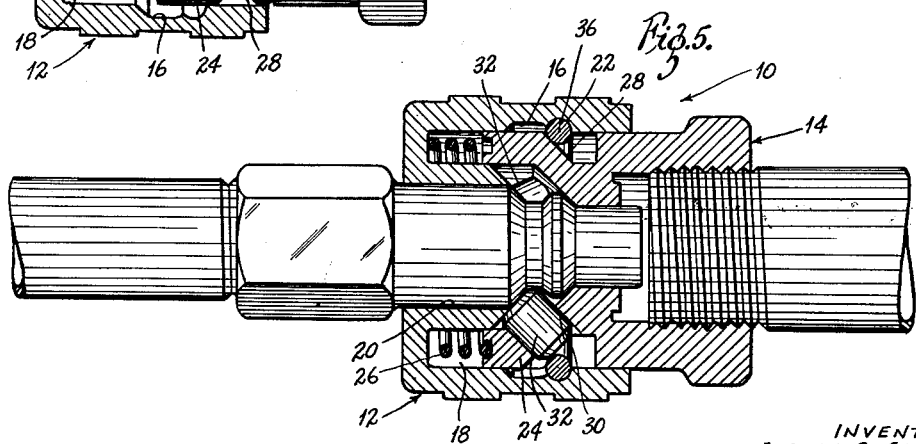
INVENTOR:
JOSEPH S. SCIUTO, JR.,
BY Kingsland, Rogers & Ezell
ATTORNEYS

United States Patent Office 3,133,755
Patented May 19, 1964

3,133,755
PIN RETAINER CONSTRUCTION FOR COUPLINGS
Joseph S. Sciuto, Jr., St. Louis, Mo., assignor to Stile-Craft Manufacturers, St. Louis, Mo., a corporation of Missouri
Filed June 29, 1960, Ser. No. 39,517
1 Claim. (Cl. 285—277)

The present invention relates generally to couplings or hose connections, and the like, and more particularly to a novel pin retainer construction for couplings.

There has long existed a demand for a simple positive pin retainer construction for hose couplings, and the like, of the type adapted for quick connection and disengagement. In couplings of this type, there are spaced pins or balls which maintain the male and female members of the coupling together when in operative engagement and which are movable into position for release of connected hose part when it is desired to quickly uncouple. It is essential that these pins or balls be retained against removal in order to insure the continued operation of the coupling. Many different devices have been employed with varying success. The present invention provides a retainer which combines the desirable features sought for such a device. Therefore, an object of the present invention is to provide a novel pin retainer construction for couplings which overcomes the disadvantages inherent in retainers in use today for the same purpose.

In brief, the present novel pin retainer construction comprises an internal annular groove in the female member of a coupling, an external annular groove in the male member, and a simple split ring, the split being at an angle to the axis of the ring, so that the free pointed end portions overlap in side-by-side relation, which permits further side-by-side overlap in shortening the diameter in installing the ring. The ring is of spring steel, or the like, so that it returns to its desired form after being operatively disposed in the annular groove in the female member of the coupling. Steel rings wear longer with steel pins or balls. Thus, the ring is disposed in the first mentioned ring and is installed through and extends into the other groove.

Hence, another object is to provide a novel pin retainer construction for couplings which is of simple form, yet positive in its retaining action.

Another object is to provide a novel pin retainer construction for couplings which presents a substantially 360° abutment surface for engagement by the pins of the coupling.

Another object is to provide a novel pin retainer construction for couplings which can be readily installed in operative relation within the coupling.

Another object is to provide a novel pin retainer construction for couplings which is inexpensive and which is adapted to function in a positive manner for the life of the couplings.

The foregoing and other objects and advantages are apparent from the following description taken with the accompanying drawing, in which:

FIGURE 1 is an end view of a coupling incorporating a pin retainer construction made in accordance with the teachings of the present invention;

FIGURE 2 is a longitudinal cross-sectional view taken on substantially the line 2—2 of FIGURE 1;

FIGURE 3 is a view similar to FIGURE 2, but with the female member in longitudinal cross section and the male member in side elevation, illustrating the novel split ring retainer construction;

FIGURE 4 is a view partially in longitudinal cross section and partially in side elevation, illustrating the manner of installation of the split ring retainer within the groove provided in the female member of the coupling; and FIGURE 5 is a longitudinal cross-sectional view through the coupling of FIGURE 1, illustrating its operative engagement with a removable hose.

Referring to the drawing more particularly by reference numerals, 10 indicates generally a coupling for hose connections, or the like, which, except as pointed out below, is available on the market. The coupling 10 includes a female member 12 and a male member 14, which are of the configurations clearly illustrated in the drawing. The female member 12 includes an annular groove 16, an annular well 18, and a hose receiving opening 20. It also has an annular groove 22 forming part of the instant improvement. The male member 14 is essentially cylindrical, including an annular front portion 24 which extends into the annular well 18 to engage a compression spring 26 disposed therein. An external groove 28 forming part of the instant improvement, is provided in the male member 14 midway the ends thereof. The portion 24 includes openings 30, three being spaced an equal distance apart, which receive pins 32 angularly disposed, as is clearly shown in the drawing.

A split ring pin retainer 36 is seated in the groove 22 in the female member 12 and extends into the external groove 28 of the male member 14. The pins 32 engage the ring pin retainer 36 when the female member 12 and the male member 14 are in expanded relation, as in FIGURE 2. Pins are thus retained against displacement and the female member 12 and the male member 14 against separation.

The split ring pin retainer 36 includes complementary end portions 38 and 40 which overlap as shown when the retainer 36 is in the groove 22. Thus, a substantially solid ring stop is provided at all times for the pins 32.

As is clear from FIGURES 3 and 4, the complementary end portions 38 and 40 are provided by splitting the retainer 36 at an angle of substantially 45° to the axis thereof. The free ends can be overlapped in side-by-side relation in the manner illustrated in FIGURE 4 for installation. In FIGURE 4, the male member 14 is being moved into the female member 12 with the retainer 36 forced down into the external groove 28 of the male member 14 and with the free ends of the retainer 36 in side-by-side overlapping relation. The retainer 36 will snap into the relationship of the other figures of the drawing as soon as it reaches the groove 22.

The retainer 36 can be split in a manner similar to that shown in the drawing, but at 90° thereto. However, the channel 28 will require modification in order to receive overlapping of the ends within the plane of the retainer 36.

It is apparent that there has been provided a novel pin retainer construction which fulfills the objects and advantages sought therefor.

It is to be understood that the foregoing description and the accompanying drawing have been given by way of illustration and example. It is also to be understood that changes in form of the elements, rearrangement of parts, and substitution of equivalent elements, which will be obvious to those skilled in the art, are contemplated as within the scope of the present invention which is limited only by the claim which follows.

What is claimed is:

In a coupling of the pipe and socket type, a socket component comprising a male member and a female member, said female member being relatively reciprocable on said male member, means limiting said reciprocal movement, means biasing said members to one extreme position of movement, said limiting means including an external groove in said male member of substantial width, an internal groove in said female member, one wall forming the groove in said male member being inclined outwardly from the axis of said male member, and a metallic ring split on a bias initially compressed into said groove in said male member and outwardly expandable to extend into the groove in said female member, said groove in said male member being of greater width than the diameter of said ring, said ring being radially collapsible into the external groove of said male member during assembly of said male and female members, said ring when expanded into said female member groove upon assembly of said male and female members extending into said male member groove and being engageable with the opposed upper edges of said male member groove, thereby limiting reciprocable movement between said male and female members, a plurality of apertures formed in said male member extending into the groove in said male member, the axis of said apertures being at substantially forty-five degrees to the axis of said male member, metallic pins reciprocally disposed in said apertures, one end of each of said pins engaging said bias split ring as a positive stop at all positions of said pins, thereby limiting displacement of said pins in one direction, and means on said female member in engagement with the other end of said pins to limit displacement thereof in the other direction, the parts being so constructed and arranged that all of said elements are retained in operative assembled relation by said ring and said pins are movable toward and from the axis of said members to effect a disconnectible coupling with a pipe.

References Cited in the file of this patent

UNITED STATES PATENTS

| | | |
|---|---|---|
| Re. 15,632 | Seng | June 19, 1923 |
| 738,503 | Waters | Sept. 8, 1903 |
| 751,345 | Saunders | Feb. 2, 1904 |
| 2,069,377 | Matthiessen | Feb. 2, 1937 |
| 2,092,116 | Hansen | Sept. 7, 1937 |
| 2,250,286 | White | July 22, 1941 |